Jan. 17, 1967 M. A. RAMADAN 3,299,334
REMOTE CONTROL SYSTEM USING A PAIR OF SEMICONDUCTOR SWITCHES TO EFFECT BIDIRECTIONAL CURRENT FLOW IN A CONTROL DEVICE
Filed Nov. 14, 1963
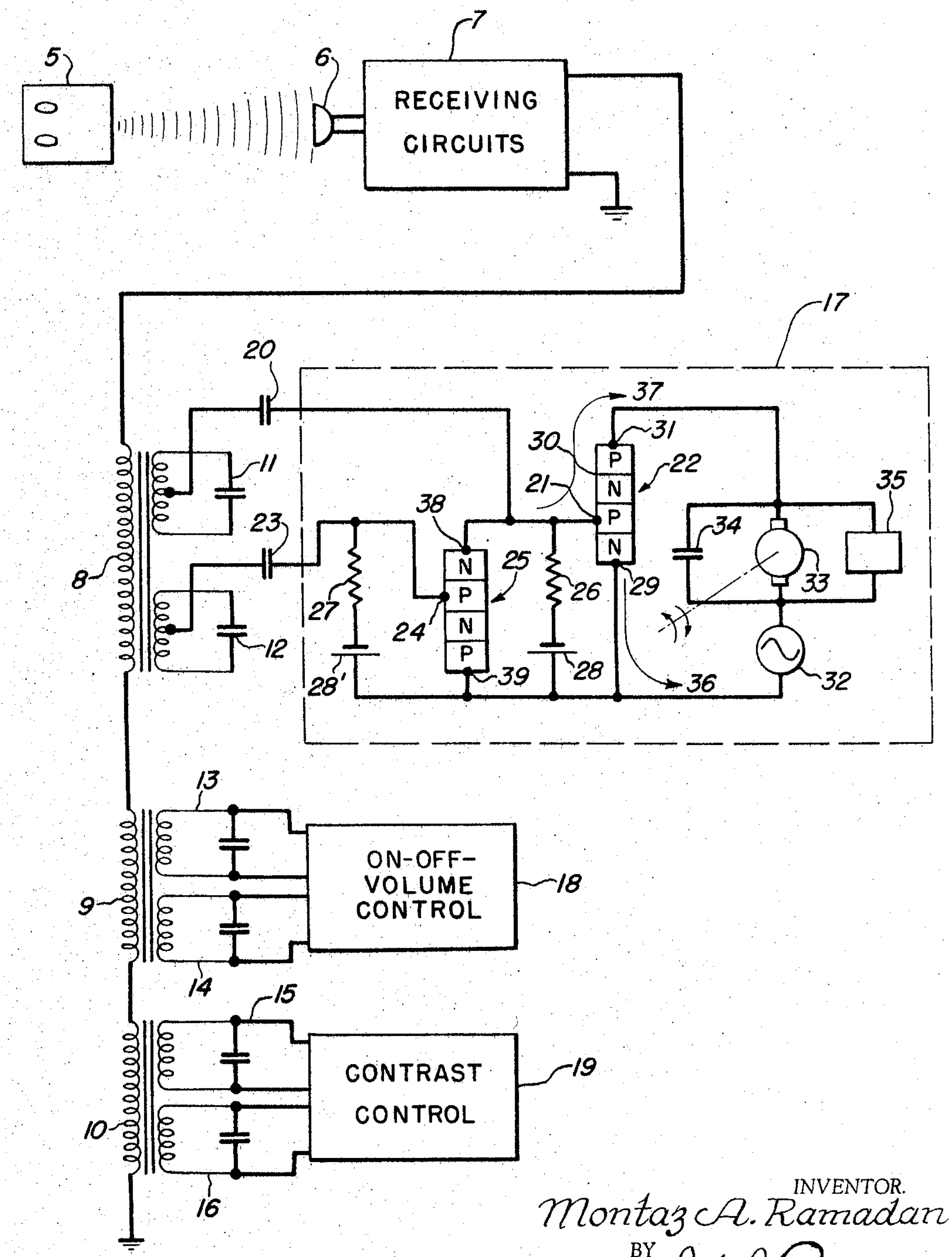
INVENTOR.
Montaz A. Ramadan
BY John J. Pederson
Atty.

3,299,334

REMOTE CONTROL SYSTEM USING A PAIR OF SEMICONDUCTOR SWITCHES TO EFFECT BI-DIRECTIONAL CURRENT FLOW IN A CONTROL DEVICE

Montaz A. Ramadan, Elmhurst, Ill., assignor to Zenith Radio Corporation, Chicago, Ill., a corporation of Delaware Filed Nov. 14, 1963, Ser. No. 323,683
5 Claims. (Cl. 318—16)

This invention is directed generally to remote control systems, and more particularly to a system for selectively utilizing superaudible command signals of different frequencies to perform control functions. The system is of particular utility for performing a pair of related remote control functions in a television receiver, and is described in that connection; it is not, however, restricted to this particular use, but may be employed in a wide variety of applications.

Remote control systems for wave-signal receivers, such as television receivers and the like have met in recent years with enthusiastic public acceptance. Preferably, the remote receiver unit should be compact enough to permit inclusion in the popular portable models without adding materially to the overall size and weight of the set. Also it is desirable to have a receiver unit that may remain on standby indefinitely. This, of course, allows continued remote operation without having to manually activate the remote receiver after periods of non-use. Additionally, and undoubtedly of greatest importance, the remote control system should be low in cost and dependable in operation.

It is a principal object of this invention to provide a new and improved remote control system for use in a television receiver or the like.

Another object of the invention is to provide an economical remote control system that is dependable in operation.

It is a further object of the invention to provide a compact remote control receiver unit of simple construction that is capable of continuous standby operation without material risk of overheating and the like.

It is still a further object of the invention to provide a simple and economical remote control receiving unit for performing a pair of related control functions in a television receiver.

In accordance with the invention, a remote control system for selectively utilizing superaudible command signals of different frequencies to perform predetermined control functions comprises a control device which is responsive to current flow in a predetermined direction to perform a first predetermined control function and responsive to current flow in the opposite direction to perform a second, different, control function. Also provided are first and second semiconductor switching devices and means, including only one of the switching devices, responsive to command signals of a predetermined first frequency for establishing current flow in the control device in the predetermined direction. Means, including both of the switching devices, and responsive to command signals of a second frequency, different than the first frequency, are provided for establishing current flow in the control device in the opposite direction.

The features of the present invention which are believed to be novel are set forth with particularity in the appended claims. The invention, together with further objects and advantages thereof, may best be understood by reference to the following description taken in connection with the accompanying drawing, in the figure of which like reference numerals identify like elements, and in which the single figure is a schematic representation of a remote control system constructed in accordance with the invention.

Referring to the figure, command signals having a frequency above the range of audibility are developed by a hand-held, push-button actuated transmitter 5 which may be of an entirely conventional construction. A microphone 6 is employed for receiving and converting the transmitted acoustical command signal to a proportional electrical signal that is in turn amplified and amplitude limited by conventional receiving circuits 7 which may include an amplifier and limiter and, if desired, a frequency multiplier.

The output of receiving circuits 7 is coupled to a plurality of series-connected primary transformer windings 8, 9 and 10. Highly frequency selective secondary transformer windings 11 and 12; 13 and 14; and 15 and 16 are magnetically coupled to primary windings 8, 9, and 10 respectively, two tuned secondary windings being provided for each primary, and electrically coupled to control units 17, 18, and 19 respectively. In the illustrated arrangement control unit 17 is utilized for channel selection while units 18 and 19, shown in block form, control on-off-volume and contrast. Although only unit 17 is shown in detail, it is to be understood that units 18 and 19 may be of similar construction.

Control unit 17 has two inputs; one from each of the selectively tuned transformer secondaries 11 and 12. Tuned circuit 11 is coupled by a capacitor 20 to a gate electrode 21 of a first semiconductor switching device 22 such as a semiconductor controlled rectifier. Tuned circuit 12 is similarly coupled by a capacitor 23 to a gate electrode 24 of a second semiconductor switching device 25, also preferably a semiconductor controlled rectifier. The respective gate electrodes 21 and 24 of switching devices 22 and 25 are normally reverse-biased through resistors 26 and 27 from respective sources of negative unidirectional operating potential 28 and 28', which in practice may constitute a single battery. It is to be understood that resistor 26 is of a relatively large magnitude to prevent appreciable current from bypassing switching device 25.

The principal conduction path between cathode 38 and anode 39 of switching device 25 is coupled between gate electrode 21 and cathode 29 respectively of switching device 22. Switching device 22 has a junction 30 with a low reverse breakdown voltage characteristic, and its principal conduction path between anode 31 and cathode 29 is coupled in series with an alternating current power source 32 and a direct current motor 33. A capacitor 34 and a conventional hold circuit 35 are coupled in parallel with motor 33.

The remote control system of the figure performs a predetermined number of control functions in a television receiver in response to received airborne command signals having frequencies above the range of audibility. Generally such a system can be adapted to perform any desired control function of the television receiver, such as channel selection, on-off-volume and contrast. The manner in which the control apparatus of the invention, shown in detail in control unit 17, may be adapted to perform any of a pair of related control functions in a television receiver, or elsewhere, will presently become apparent to those skilled in the art.

With reference to the operation of the illustrated system, command signals having a frequency above the range of audibility are developed by a portable, hand-held transmitter 5. One suitable form of mechanical transmitter comprises a set of aluminum rods that are separately and selectively set into resonant longitudinal vibration by respective push-button actuated striking hammers. Each such rod has a length preselected to establish the desired command signal frequency.

Aside from the transmitter 5, the remote control system has a companion receiver chassis, often referred to as a remote amplifier located immediately adjacent to and operatively associated with the television receiver to be controlled. Such a remote amplifier comprises means, including an input circuit, for receiving and developing from the command signals respective electrical control signals each of a frequency related to that of the command signal from which it is developed. This portion of the circuit is designated in the accompanying diagram by microphone 6 and receiving circuits 7.

Microphone 6 operates in a usual manner to receive and develop a proportional electrical signal from the transmitted compressional wave signal. The electrical signal is then amplified and amplitude limited by conventional receiver circuits 7 which, as previously stated, may include an amplifier and limiter. Also since the remote amplifier operates at high gain in order to have the required sensitivity there is a possibility of feedback which may be minimized by providing a frequency multiplier within receiver circuits 7. A frequency multiplier aids in stabilizing the amplifier in spite of its high gain. Therefore, it will be understood that the developed control signal from receiving circuits 7 may be either of a frequency equal to that of the transmitted command signal or to some integral multiple thereof.

The amplified control signals from receiving circuits 7 are supplied to the frequency selective transformer circuits comprising series coupled primary windings 8–10 and sharply tuned secondary windings 11–16. Each of the secondary windings is selectively tuned so that at the low impedance or resonant frequency of one, all the others represent a very high impedance. By this means, essentially all of the signal energy of a particular control frequency from receiving circuits 7 is delivered to the corresponding resonant secondary winding. This control signal energy, so derived, is then available to actuate the appropriate, and only the appropriate, control unit in a manner to be presently described.

The control unit 17 comprises a control device 33 responsive to current flow in a predetermined direction to perform a first predetermined control function and responsive to current flow in an opposite direction to perform a second, different, control function. Specifically, the control device 33 shown in the accompanying drawing is a direct current motor, although it may be understood that any device that is sensitive to the direction of current flow, such as a polarized relay, could also be used in conjunction with the circuit of the invention. Since motor 33 is bidirectional, it is a simple matter to have it accomplish either of two control functions in accordance with its direction of rotation through the mere expedient of coupling the controlled elements with the motor shaft through opposed unidirectional or one-way coupling clutches.

Control unit 17 is also provided with means, including a first gate-controlled solid-state switching device 22, responsive to command signals of a predetermined first frequency for establishing current flow in motor 33 in a predetermined direction. A second gate-controlled solid-state switching device 25, forward biased on alternate half-cycles from source 32 through switching device 22, is responsive in combination with switching device 22 to command signals of a predetermined second frequency, different than the first frequency, for establishing current flow in motor 33 in an opposite direction.

First and second gate-controlled solid-state switching devices 22 and 25, known commercially as semiconductor controlled rectifiers, may be formed of contiguous layers of alternate conductivity as denoted by the legend PNPN in the figure. Of course, it is to be understood that the alternate polarity of NPNP is equally useful. Switching device 22, as is well known in the art, possesses conduction characteristics similar to those of a thyratron i.e. only a signal of proper polarity and above a predetermined threshold at gate electrode 21 will initiate conduction in a forward direction between the principal electrodes 31 and 29. Once initiated, the principal conduction path between anode 31 and cathode 29 is maintained, irrespective of the signal potential on gate 21, until the forward bias is removed from the principal electrodes. Second switching device 25 having anode 39, cathode 38 and a gate electrode 24 is of like construction and functions in a similar manner.

In some remote control systems it is not only desirable, but economical to selectively and signal responsively rectify either the positive or negative half-cycle of ordinary alternating current line voltage to provide current of a desired polarity to a control device that is sensitive to the direction of the energizing current. One such prior art circuit employs two controlled rectifiers each separately coupled in parallel with a series arrangement of a control device and an alternating current power source. The controlled rectifiers are coupled inversely to each other, i.e. if one is forward-biased from the alternating current source then the other is necessarily reverse-biased. Thus two distinct energizing current paths are formed; one capable of passing current of one polarity and the other path capable of passing current of the opposite polarity. In such a circuit, however, each controlled rectifier is subject to a periodic large reverse bias. At present, only expensive controlled rectifiers of the silicon variety are able to withstand such large reverse biases without incurring reverse breakdown i.e. the formation of a low impedance path between the anode and gate electrodes. Thus remote control systems of this prior design have, of necessity, employed expensive controlled rectifiers or have used auxiliary diodes in conjunction with low-cost controlled rectifiers. The novel circuit of the present invention retains all of the advantages of prior remote control systems of this type, but employs only low cost controlled rectifiers without the use of auxiliary diodes.

The alternating current source 32 forward biases switching device 22 on positive half-cycles, or at times when anode 31 is electrically positive with respect to cathode 29. If during this period a control signal above a predetermined threshold is received at gate electrode 21, switching device 22 is triggered into conduction and current flows from source 32 through motor 33 and switching device 22 in the direction indicated by the arrow 36. On alternate half-cycles, switching device 25 is forward biased from source 32 through junction 30 of switching device 22. The junction 30 may have, as previously stated, an inherent low reverse breakdown voltage characteristic, or it may be specially constructed in such a manner as to have a predetermined low reverse breakdown voltage characteristic. At any rate, a control signal received at gate electrode 24 at this time via receiving circuits 7 and tuned circuit 14 triggers switching device 25 into conduction. A unidirectional current path is thus formed from source 32, through the principal conduction path of switching device 25, gate electrode 21 to anode 31 of controlled rectifier 22, and motor 33 in the direction indicated by the arrow 37.

Each switching device is forward biased only on alternate half-cycles from source 32, hence, it is to be understood that a control signal must persist at the gate electrode of the desired switching device for a time in excess of one half-cycle of source voltage to be assured of triggering the switching device into conduction. This feature improves the noise immunity of the remote control system, as a spurious signal will not necessarily cause false actuation of the control apparatus. The noise immunity may be further improved by a judicious choice of the combination of motor 33, capacitor 34 and holding circuit 35. If the time constant or response time of this apparatus is chosen so as to be in excess of one or more cycles of alternating source voltage, it will be necessary for the control signal to persist at a respective gate electrode for some predetermined time to result in performance of the desired control function. Operation is therefore prevented until an integrated energy level established by capacitor 30 has existed for a minimum time duration. As extraneous noise signals are usually of a relatively short duration, such a system will be essentially immune to false actuation without requiring the bulky and expensive integrating and detector circuits of some previous remote control systems.

Additionally, the receiving unit of the present invention lends itself especially well to transistorizing, as it employs semiconductor switching devices to actuate the control apparatus. Besides the attendant advantage of miniaturization, transistorization allows for power requirements and operating voltages to be so reduced that it is entirely feasible to permit the receiver chassis to remain on a standby basis indefinitely. This, of course, increases the utility of the control arrangement.

With the illustrated control system, it is usually adequate to have the response to the command signal restricted to the requirement for closing holding circuit 35. This has the advantage of freeing the actuation of the motor 33 from the duration of the command signal so long as the command signal exceeds the minimum time duration requirement of the system. The conventional holding circuit 35, once completed, steps the motor driven channel selector in a step-by-step fashion from one television channel to the next. It is also well understood in the art that the energizing circuit is disabled after stepping the channel selector one position and, if desired a delay may be introduced before the energizing circuit of the motor 33 is permitted to respond to another command signal to protect against the circumstances of a command signal of an unusually long duration causing multiple responses of the system.

Switching device 22 is subject to passing large reverse currents during periods of conduction of switching device 25. To prevent thermal runaway and consequent destruction of device 22, it is occasionally necessary to provide means for dissipating excessive heat. Although the heat to be dissipated is a function of the particular characteristics of the switching device, a conventional heat sink has been found to provide adequate protection under normal circumstances. It will be noted that switching device 25 is not subjected to any reverse bias due to the unique circuit configuration. A heat sink, therefore, need not be provided for switching device 25.

Thus the present invention provides an extremely simple, compact remote control system of a unique and economical design which retains such advantages as excellent noise immunity, adaptability to transistorization, and capability of indefinite standby operation.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A remote control system for selectively utilizing superaudible command signals of different frequencies to perform predetermined control functions, said system comprising:

a control device responsive to current flow in a predetermined direction to perform a first predetermined control function and responsive to current flow in the opposite direction to perform a second, different, control function;

first and second semiconductor switching devices;

means including only one of said switching devices and responsive to said command signals of a predetermined first frequency for establishing current flow in said control device in said predetermined direction;

and means including both of said switching devices and responsive to said command signals of a second frequency, different than said first frequency, for establishing current flow in said control device in said opposite direction.

2. A remote control system for selectively utilizing superaudible command signals of different frequencies to perform predetermined control functions, said system comprising:

means, including an input circuit, for receiving and developing from said command signals respective electrical control signals each of a frequency related to that of the received command signal from which it is developed;

a control device responsive to current flow in a predetermined direction to perform a first predetermined control function and responsive to current flow in the opposite direction to perform a second, different, control function;

first and second gate controlled solid-state switching devices;

means including only one of said gate controlled solid-state switching devices and responsive to command signals of a predetermined first frequency for establishing current flow in said control device in said predetermined direction;

means for forward biasing said second switching device through said first switching device;

and means including both said first and second switching devices and responsive to command signals of a second frequency, different than said first frequency, for establishing current flow in said control device in said opposite direction.

3. A remote control system for selectively utilizing superaudible command signals of different frequencies to perform predetermined control functions, said system comprising:

means, including an input circuit, for receiving and developing from said command signals respective electrical control signals each of a frequency related to that of the received command signal from which it is developed;

a control device responsive to current flow in a predetermined direction to perform a first predetermined control function and responsive to current flow in the opposite direction to perform a second, different, control function;

first and second semiconductor switching devices;

means including only one of said switching devices and directly responsive to said control signals of a predetermined first frequency for establishing current flow in said control device in said predetermined direction;

and means including both of said switching devices and directly responsive to said control signals of a second frequency, different than said first frequency, for establishing current flow in said control device in said opposite direction.

4. A remote control system for selectively utilizing received superaudible command signals of different frequencies to actuate a direct-current motor in either its forward or reverse direction from an alternating voltage source, said system comprising:

a first gate-controlled solid-state switching device having anode, gate and cathode electrodes and having a junction between said anode and gate electrodes with a predetermined low reverse breakdown voltage characteristic;

a second gate-controlled solid-state switching device having a pair of principal electrodes and a principal conduction path therebetween;

means coupling said motor in series with the anode-cathode conduction path of said first switching device and with said source;

means including an input circuit between said gate and cathode electrodes and responsive to one of said received command signals for triggering said first switching device and establishing current flow through said motor in a predetermined direction to initiate forward rotation thereof;

means coupling said principal conduction path of said second switching device between said gate and cathode electrodes of said first switching device whereby said second switching device is forward biased during alternate half cycles of said alternating source voltage;

and means responsive to another of said control signals for triggering said second switching device into conduction and establishing current flow through said principal conduction path, said junction, and said motor in a direction opposite to said predetermined direction to initiate reverse rotation of said motor.

5. A remote control system for selectively utilizing received superaudible command signals of different frequencies to actuate a direct current motor in either its forward or reverse direction from an alternating voltage source, said system comprising:

means for receiving and developing from said command signals respective electrical control signals each of a frequency related to that of the received command signal from which it is developed;

a first gate-controlled rectifier having anode, cathode, and gate electrodes and having a junction between said anode and gate electrodes with a predetermined low reverse breakdown voltage characteristic;

a second gate-controlled rectifier having a pair of principal electrodes and a principal conduction path therebetween;

means coupling said motor in series with the anode-cathode conduction path of said first controlled rectifier and with said source;

means coupled to said control-signal-developing means and including an input circuit between said gate and cathode electrodes for triggering said first controlled rectifier directly with control signals of a predetermined first frequency and establishing current flow through said motor in a predetermined direction to initiate forward rotation thereof;

means for coupling said principal conduction path of said second controlled rectifier between said gate and cathode electrodes whereby said second controlled rectifier is forward-biased on alternate half-cycles from said source through said first controlled rectifier;

and means directly responsive to control signals of a second frequency, different than said first frequency, for triggering said second controlled rectifier into conduction and establishing current flow through said principal conduction path, said junction, and said motor in a direction opposite to said predetermined direction to initiate reverse rotation of said motor.

References Cited by the Examiner

UNITED STATES PATENTS

| | | | |
|---|---|---|---|
| 3,022,454 | 2/1962 | Millis | 318—345 X |
| 3,144,598 | 8/1964 | Merritt | 318—16 X |
| 3,202,967 | 8/1965 | Wolff | 318—16 X |

ORIS L. RADER, *Primary Examiner.*

T. LYNCH, *Assistant Examiner.*